(12) United States Patent
Ma

(10) Patent No.: US 10,330,360 B2
(45) Date of Patent: Jun. 25, 2019

(54) AIR CONDITIONING SYSTEM WITH DISTILLED WATER PRODUCTION FROM AIR

(71) Applicant: Carrier Corporation, Jupiter, FL (US)

(72) Inventor: Zidu Ma, Ellington, CT (US)

(73) Assignee: CARRIER CORPORATION, Farmington, CT (US)

( * ) Notice: Subject to any disclaimer, the term of this patent is extended or adjusted under 35 U.S.C. 154(b) by 0 days.

(21) Appl. No.: 15/695,494

(22) Filed: Sep. 5, 2017

(65) Prior Publication Data

US 2017/0363336 A1 Dec. 21, 2017

Related U.S. Application Data

(62) Division of application No. 14/003,680, filed as application No. PCT/US2012/029400 on Mar. 16, 2012, now Pat. No. 9,784,489.

(60) Provisional application No. 61/453,300, filed on Mar. 16, 2011.

(51) Int. Cl.
*F25B 43/00* (2006.01)
*E03B 3/28* (2006.01)
*F24F 3/14* (2006.01)

(52) U.S. Cl.
CPC ............... *F25B 43/00* (2013.01); *E03B 3/28* (2013.01); *F24F 3/1417* (2013.01); *Y02A 20/109* (2018.01)

(58) Field of Classification Search
CPC ........ B01D 5/00; B01D 5/0057; B01D 5/006; B01D 5/0075; B01D 5/0078; B01D 5/009; F24F 3/1417; E03B 3/28; F25B 43/00
See application file for complete search history.

(56) References Cited

U.S. PATENT DOCUMENTS 2,535,008 A * 12/1950 Crawford ............. B01D 1/0082
159/4.1
3,404,537 A 10/1968 Leonard, Jr.
(Continued)

FOREIGN PATENT DOCUMENTS

CN 1295662 A 5/2001
CN 1323644 A 11/2001
(Continued)

OTHER PUBLICATIONS

First Office Action; CN Application No. 2012800135309; Issued by The State Intellectual Property Office of The People's Republic of China dated Aug. 17, 2015; 7 pages.
(Continued)

*Primary Examiner* — Filip Zec
(74) *Attorney, Agent, or Firm* — Cantor Colburn LLP

(57) ABSTRACT

An air conditioning and water producing system includes a heat pumping unit and a membrane contactor in thermal communication with the heat pumping unit. The membrane contactor is configured such that a first brine flow is cooled by the heat pumping unit and diluted at the membrane contactor. A distiller is in thermal communication with the heat pumping unit and the membrane contactor such that a second brine flow is heated by the heat pumping unit and conveyed through the distiller. Thermal interaction between the second brine flow and the first brine flow flowing through the distiller extracts water from the second brine flow.

7 Claims, 1 Drawing Sheet

(56) References Cited

U.S. PATENT DOCUMENTS

| | | | |
|---|---|---|---|
| 4,143,523 A * | 3/1979 | Burger | F24D 11/0285 |
| | | | 62/324.6 |
| 4,313,312 A * | 2/1982 | Ito | E03B 3/28 |
| | | | 62/271 |
| 6,365,051 B1 | 4/2002 | Bader | |
| 6,557,266 B2 | 5/2003 | Griffin | |
| 6,656,361 B1 | 12/2003 | Herron et al. | |
| 7,823,396 B2 | 11/2010 | Al-Mayahi | |
| 2006/0076294 A1 | 4/2006 | Sirkar et al. | |
| 2006/0144788 A1 | 7/2006 | Cath et al. | |
| 2008/0276630 A1 | 11/2008 | Lukitobudi et al. | |
| 2009/0152199 A1 | 6/2009 | Ma et al. | |
| 2009/0211276 A1 * | 8/2009 | Forkosh | E03B 3/28 |
| | | | 62/94 |
| 2010/0051549 A1 * | 3/2010 | Ma | B01D 61/364 |
| | | | 210/640 |
| 2010/0065496 A1 | 3/2010 | Ma et al. | |
| 2010/0072135 A1 | 3/2010 | Hanemaaijer et al. | |
| 2011/0180383 A1 * | 7/2011 | Ma | B01D 61/364 |
| | | | 203/22 |
| 2011/0180479 A1 | 7/2011 | Cordatos et al. | |
| 2011/0233137 A1 | 9/2011 | Cath et al. | |
| 2012/0067819 A1 | 3/2012 | McGinnis | |
| 2012/0091061 A1 * | 4/2012 | Al-Jlil | B01D 61/002 |
| | | | 210/640 |
| 2013/0298590 A1 * | 11/2013 | Heinzl | B01D 53/268 |
| | | | 62/271 |
| 2013/0319246 A1 * | 12/2013 | Ball | B01D 53/263 |
| | | | 96/112 |
| 2013/0340468 A1 | 12/2013 | Ma | |

FOREIGN PATENT DOCUMENTS

| | | |
|---|---|---|
| CN | 1392312 A | 1/2003 |
| CN | 2937894 Y | 8/2007 |
| CN | 101435608 A | 5/2009 |
| CN | 101435615 A | 5/2009 |
| CN | 101851946 A | 10/2010 |
| CN | 101939085 A | 1/2011 |
| CN | 201711096 U | 1/2011 |
| EP | 0016470 A1 | 1/1980 |
| EP | 0678321 A2 | 10/1995 |
| EP | 2181743 A1 | 5/2010 |
| WO | 2006129200 A2 | 12/2006 |

OTHER PUBLICATIONS

Notification of Transmittal of the International Search Report and the Written Opinion of the International Searching Authority, or the Declaration; PCT/US2012/029400; dated Sep. 11, 2012; 12 pages.
Office Action; EP Application No. 12712030.1-1602; Issued by European Patent Office dated Sep. 10, 2015; 4 pages.
Translated International Search Report; CN Application No. 2012800135309; Issued by The State Intellectual Property Office of The People's Republic of China dated Aug. 3, 2015; 3 pages.

* cited by examiner

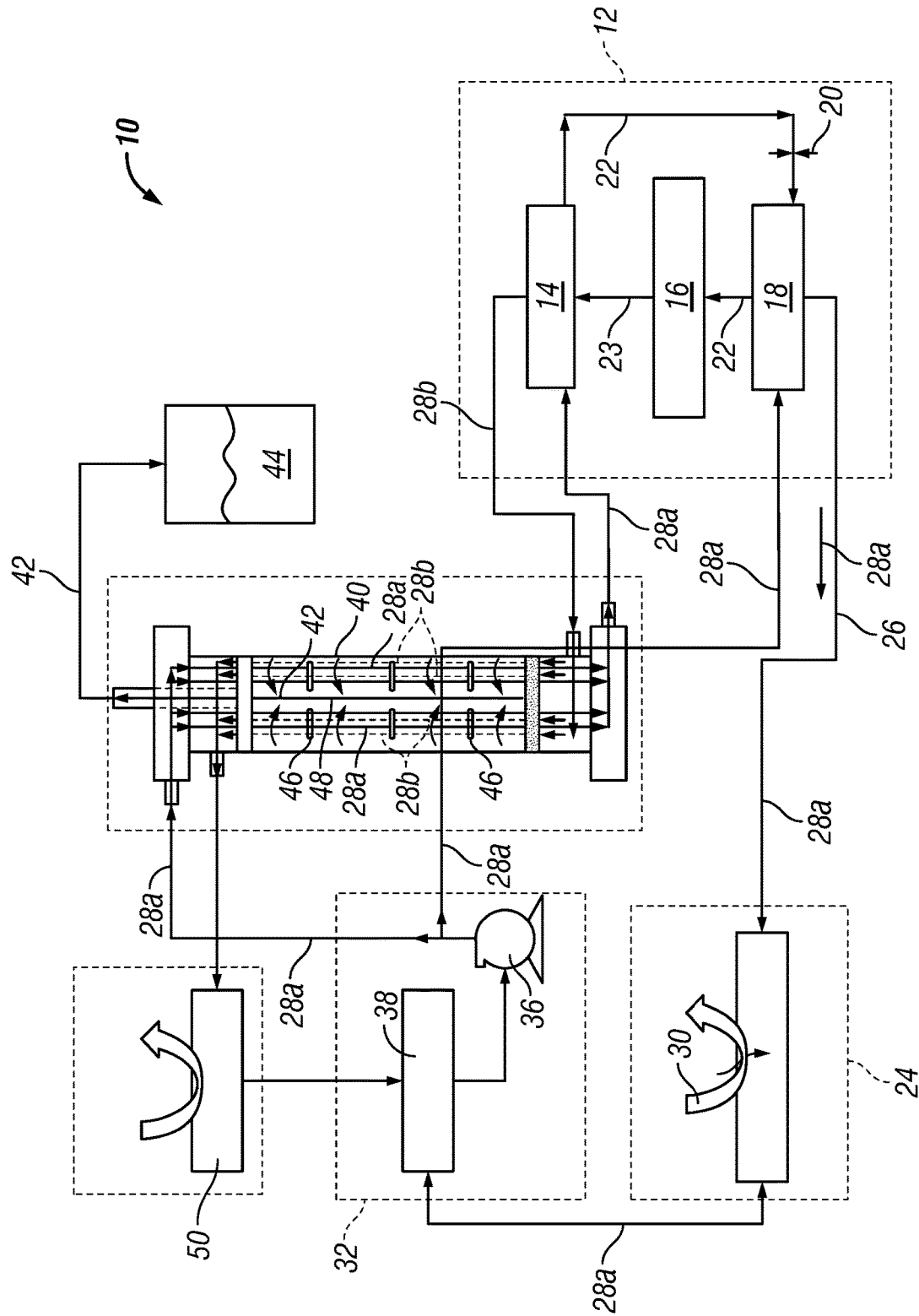

1

AIR CONDITIONING SYSTEM WITH DISTILLED WATER PRODUCTION FROM AIR

CROSS REFERENCE TO RELATED MATTERS

The present application is a divisional application of U.S. patent application Ser. No. 14/003,680 filed on Sep. 6, 2013, and further claims priority to International Application No. PCT/US2012/029400 filed Mar. 16, 2012, which claims the benefit of U.S. Provisional Patent Application No. 61/453,300 filed on Mar. 16, 2011, the disclosures of which are incorporated herein by reference.

BACKGROUND OF THE INVENTION

The subject matter disclosed herein relates to air conditioning systems. More specifically, the subject disclosure relates to humidity control for air conditioning systems.

Heating, ventilation, air conditioning and refrigeration (HVAC&R) systems produce large quantities of heat which are rejected to the ambient environment, especially when the HVAC&R system is operated in cooling mode. The rejected heat represents an efficiency loss to the system. The art would well receive improvements to the HVAC&R system to productively utilize this otherwise rejected heat.

BRIEF DESCRIPTION OF THE INVENTION

According to one aspect of the invention, an air conditioning and water producing system includes a heat pumping unit and a membrane contactor in thermal communication with the heat pumping unit. The membrane contactor is configured such that a first brine flow is cooled by the heat pumping unit and diluted at the membrane contactor. A distiller is in thermal communication with the heat pumping unit and the membrane contactor such that a second brine flow is heated by the heat pumping unit and conveyed through the distiller. Thermal interaction between the second brine flow and the first brine flow flowing through the distiller extracts water from the second brine flow.

According to another aspect of the invention, a method of extraction of water from air includes cooling a first brine flow at a heat pumping unit and absorbing moisture into the first brine flow via an enthalpy exchange between the first brine flow and an airflow at a membrane contactor. A second brine flow is heated at the heat pump and the first brine flow and the second brine flow are conveyed into a distiller. Water is extracted from the second brine flow at the distiller.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The FIGURE is a schematic of an embodiment of an air conditioning system.

The detailed description explains embodiments of the invention, together with advantages and features, by way of example with reference to the drawings.

DETAILED DESCRIPTION OF THE INVENTION

Shown in the FIGURE is a schematic of an air conditioning system 10. The system 10 includes a heat pump unit 12. It is to be appreciated that while a heat pump 12 is shown in the FIGURE and described herein, it is merely exemplary and other types of air conditioning units such as chillers, absorption chillers and/or vapor compression chillers may be utilized in the system 10. The heat pump 12 includes a condenser 14, a compressor 16, an evaporator 18 and an expansion valve 20. A refrigerant pathway 22 circulates refrigerant through the condenser 14, compressor 16, evaporator 18 and expansion valve 20. An enthalpy exchanger, for example, a membrane contactor 24, is connected to the evaporator 18 via one or more evaporator outlet pathways 26 which transports a first flow of brine 28a from the evaporator 18 to the membrane contactor 24. The enthalpy exchanger is capable of transferring latent and sensible heat at the same time. The first brine flow 28a is cooled in the evaporator 18 via exchange of thermal energy with the refrigerant flowing through the evaporator 18. The first brine flow 28a flows through the membrane contactor 24 and absorbs thermal energy and moisture from a flow of process air 30, which may be outdoor air or air to be cooled in a building or other structure. Thus the first brine flow 28a is diluted (via the absorption of moisture) and warmed (by thermal energy exchange with the process air).

A brine system 32 is connected to the membrane contactor 24 via one or more diluted brine pathways. In some embodiments, the brine system 32 includes a brine pump 36 and a brine sump 38. The diluted first brine flow 28a is routed to the brine sump 38 and pumped out of the brine system 32 by the brine pump 36. The first brine flow 28a from the brine pump 36 is divided into at least two portions, with a first portion 28a conveyed to the evaporator 18 and flowed therethrough and then to the membrane contactor 24 as described above. The second portion 28a is conveyed to a distiller, for example, a liquid gap membrane distiller 40, which can be driven by low temperature heat from the condenser 14. The second portion 28a flows through the distiller 30 and picks up the condensing heat from the distillation process.

A second brine flow 28b is circulated through the condenser 14 and is further heated via a thermal energy exchange with the flow of refrigerant through the condenser 14. This heated second brine flow 28b is routed to the distiller 40 and flowed therethrough. With the two separate brine flows 28a and 28b flowing through the distiller 40, the temperature difference between the second brine flow 28b and the relatively cooler first brine flow 28a causes water vapor transfer from warmer brine 28b across hydrophobic porous membranes (46) and condense at the surface of solid tubes (48) and becomes distilled water 42. The distilled water 42 may be collected in a storage tank 44.

The first brine flow 28a, pre-heated by the condensing heat from the distilled water 42, exits the distiller 40 and is circulated through the condenser 14 and back to the distiller 40 as the second brine flow 28b to enter into the porous membrane side 46 of the distiller 40. The second brine flow 28b, having water distilled from it, is conveyed from the exit of the membrane 46 side of distiller 40 to and across a heat exchanger, for example, a fan coil 50, where heat is rejected from the second brine flow 28b to the ambient environment, which may be outside air or room exhaust. The second brine flow 28b is then routed to the brine sump 38 for recirculation through the system 10.

The system 10 described herein collects moisture from air and cools the air, thereby reducing humidity and temperature if so desired and utilizes heat from condenser 14 to distill water from a brine 28 circulated through the system 10.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method of extraction of water from air comprising:
   cooling a first brine flow at an evaporator of a heat pumping unit;
   absorbing moisture into the first brine flow via a thermal energy exchange between the first brine flow and an airflow at a membrane contactor;
   flowing a second brine flow through a distiller a first time;
   heating the second brine flow at a condenser of the heat pumping unit after flowing the second brine flow through the distiller the first time;
   flowing the first brine flow and the second brine flow into the distiller, after heating the second brine flow at the condenser, the second brine flow flowing through the distiller a second time;
   extracting water from the second brine flow at the distiller via thermal interaction between the second brine flow flowing through the distiller for the first time and the second brine flow flowing through the distiller for the second time; and
   conveying the first brine flow and the second brine flow to a brine sump.

2. The method of claim 1, further comprising rejecting heat from the second brine flow after extracting water therefrom.

3. The method of claim 1, further comprising pumping at least a portion of the first brine flow to the heat pumping unit.

4. The method of claim 1, wherein the heat pumping unit is a vapor-compression heat pump or a sorption heat pump.

5. The method of claim 1, wherein the distiller is a liquid gap membrane distiller.

6. The method of claim 1, further comprising cooling the airflow at the membrane contactor.

7. The method of claim 1, further comprising storing the distilled water in a tank.

* * * * *